(12) United States Patent
Kato et al.

(10) Patent No.: US 9,577,484 B2
(45) Date of Patent: Feb. 21, 2017

(54) VARIABLE MAGNETOMOTIVE FORCE ROTARY ELECTRIC MACHINE AND CONTROL DEVICE FOR VARIABLE MAGNETOMOTIVE FORCE ROTARY ELECTRIC MACHINE

(75) Inventors: Takashi Kato, Fujisawa (JP); Robert Lorenz, Madison, WI (US); Natee Limsuwan, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 292 days.

(21) Appl. No.: 14/408,974

(22) PCT Filed: Jun. 26, 2012

(86) PCT No.: PCT/US2012/044257
§ 371 (c)(1),
(2), (4) Date: Dec. 18, 2014

(87) PCT Pub. No.: WO2014/003729
PCT Pub. Date: Jan. 3, 2014

(65) Prior Publication Data
US 2015/0137648 A1     May 21, 2015

(51) Int. Cl.
*H02K 1/27*     (2006.01)
*H02P 21/14*    (2016.01)
*H02P 21/00*    (2016.01)

(52) U.S. Cl.
CPC .......... *H02K 1/276* (2013.01); *H02P 21/0085* (2013.01); *H02P 21/141* (2013.01)

(58) Field of Classification Search
CPC ..... H02K 1/276; H02P 21/0085; H02P 21/141
USPC ................................. 310/156.53; 318/400.02
See application file for complete search history.

(56) References Cited

U.S. PATENT DOCUMENTS 6,008,559 A * 12/1999 Asano ................... H02K 1/2766
                                                          310/156.53
7,981,359 B2 * 7/2011 Masuzawa ............. H02K 1/276
                                                          264/120
8,044,548 B2 * 10/2011 Sakai .................... H02K 1/2766
                                                          310/156.36
2006/0170301 A1 * 8/2006 Masuzawa ............. H02K 1/276
                                                          310/156.53

(Continued)

FOREIGN PATENT DOCUMENTS

EP           1995849 A2     11/2008
JP         2004-201425 A     7/2004

(Continued)

*Primary Examiner* — Alex W Mok
(74) *Attorney, Agent, or Firm* — Global IP Counselors, LLP

(57) ABSTRACT

A rotary electric machine includes a stator and a rotor. The rotor has at least one permanent magnet arranged in a d-axis magnetic path. The rotor includes a magnetic gap part located between the permanent magnet arranged in the d-axis magnetic path of one pole and an adjacent magnet with a different polarity, such that a d-axis magnetic flux forms a d-axis bypass passing through an area other than the permanent magnet. The d-axis bypass provides a magnetic resistance in a d-axis direction that is set below a magnetic resistance in a q-axis direction that is orthogonal to the d-axis resistance.

20 Claims, 10 Drawing Sheets

(56) References Cited

U.S. PATENT DOCUMENTS

| | | | |
|---|---|---|---|
| 2007/0018606 A1 | 1/2007 | Iura et al. | |
| 2008/0290753 A1* | 11/2008 | Arimitsu | H02K 1/246 310/156.36 |
| 2010/0060223 A1* | 3/2010 | Sakai | H02K 1/2766 318/494 |
| 2010/0213885 A1* | 8/2010 | Ichiyama | H02K 1/276 318/720 |
| 2010/0327787 A1* | 12/2010 | Sakai | H02K 1/276 318/400.09 |
| 2011/0309706 A1* | 12/2011 | Takahashi | H02K 1/276 310/156.53 |
| 2012/0175988 A1* | 7/2012 | Hino | H02K 1/276 310/156.38 |

FOREIGN PATENT DOCUMENTS

| | | |
|---|---|---|
| JP | 2006-280195 A | 10/2006 |
| JP | 2008-295138 A | 4/2008 |
| WO | 2004/070918 A1 | 8/2004 |
| WO | 2012/032369 A1 | 3/2012 |

* cited by examiner

VARIABLE MAGNETOMOTIVE FORCE ROTARY ELECTRIC MACHINE AND CONTROL DEVICE FOR VARIABLE MAGNETOMOTIVE FORCE ROTARY ELECTRIC MACHINE

CROSS-REFERENCE TO RELATED APPLICATIONS

This application is a U.S. National stage application of International Application No. PCT/JP2012/044257, filed Jun. 26, 2012, the contents of which is hereby incorporated herein by reference.

BACKGROUND

Field of the Invention

The present invention generally relates to a variable magnetomotive force rotary electric machine that is used in vehicle motors and the like, and relates to a control device for the variable magnetomotive force rotary electric machine.

Background Information

A well-known example of a rotary electric machine used in interior permanent magnet motors (IPM motors) is disclosed in Japanese Laid-Open Patent Application No. 2008-295138). This Japanese Application discloses forming a plurality of flux barriers (layers having low magnetic permeability) on the q-axis magnetic path of the stator, providing a magnetic path on the d-axis such that Ld>Lq (where Ld is the d-axis inductance, and Lq is the q-axis inductance), performing strong magnetic-field control, and limiting the demagnetizing field in the permanent magnet to reduce the magnet volume.

However, in cases where these rotary machines are used in a high-rotation zone, the weak magnetic-field control is weaker than a typical flux-weakening interior permanent magnet (FW-IPM), but weak magnetic-field control is still needed, necessitating the use of expensive, high-coercivity magnets obtained by adding Dy (dysprosium) to a Nd—Fe—B alloy (where Nd is neodymium, Fe is iron, and B is boron).

From the perspective of variable characteristics, the rotary electric machine disclosed in Patent Literature 2 (Japanese Laid-Open Patent Application No. 2006-280195) has been proposed. However, a high-coercivity magnet and a low-coercivity magnet must be assembled together in this rotary electric machine, and this machine cannot be readily employed in cases where the supply of materials for the high-coercivity magnet is low. Additionally, problems have been presented in that the low-coercivity magnet is irreversibly demagnetized in high-load states, and strong magnetic-field control is therefore necessary to maintain magnetization, but in cases where it is not the case that Ld>Lq, a reluctance torque occurs in the opposite direction from the magnet torque, and efficiency therefore deteriorates in high-load zones.

SUMMARY

One object presented in this disclosure is to provide a variable magnetomotive force rotary electric machine and a control device for the variable magnetomotive force rotary electric machine that can obtain stable torques without using expensive high-coercivity magnets, and in which weak magnetic-field control is not required in zones of high rotational speed.

In view of the above, a variable magnetomotive force rotary electric machine is provided that basically includes a stator and a rotor. The rotor has at least one permanent magnet arranged in a d-axis magnetic path. The rotor includes a magnetic gap part located between the permanent magnet arranged in the d-axis magnetic path of one pole and an adjacent magnet with a different polarity, such that a d-axis magnetic flux forms a bypass passing through an area other than the permanent magnet. The d-axis bypass provides a magnetic resistance in a d-axis direction that is set below a magnetic resistance in a q-axis direction that is orthogonal to the d-axis resistance. The permanent magnet has a coercivity providing for complete magnetization by a magnetic field equal to or less than an armature reaction that is produced by a power-supplying inverter. The permanent magnet has a ratio of a circumferential length of the at least one permanent magnet with respect to a length of a single pole on a circumference of the rotor that is 50% or less. The magnetic gap part is arranged in a q-axis magnetic path, with a radial width length of the magnetic gap part in the direction of the q-axis magnetic path being greater than a dimension of the permanent magnet in a magnetization direction.

With this variable magnetomotive force rotary electric machine, the coercivity and thickness of a permanent magnet are prescribed so that magnetization and demagnetization are possible according to the maximum value of the armature reaction obtained from the maximum current that can flow through the stator winding wrapped around teeth of the stator. Preferably, a d-axis bypass that does not pass through the permanent magnet in the d-axis magnetic path is provided, and a magnetic gap part is provided to the q-axis magnetic path, whereby characteristics of Ld>Lq are obtained. Preferably, a pole arc ratio of the permanent magnet is 50% or less. The magnetization state can thereby be maintained in cases where the rotary electric machine is being driven. The characteristics of the variable magnetomotive force rotary electric machine are such that Ld>Lq, whereby re-magnetization is possible in cases where weak magnetic-field operation is performed in zones of high rotation, materials having high coercivity need not be used, and costs can be reduced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
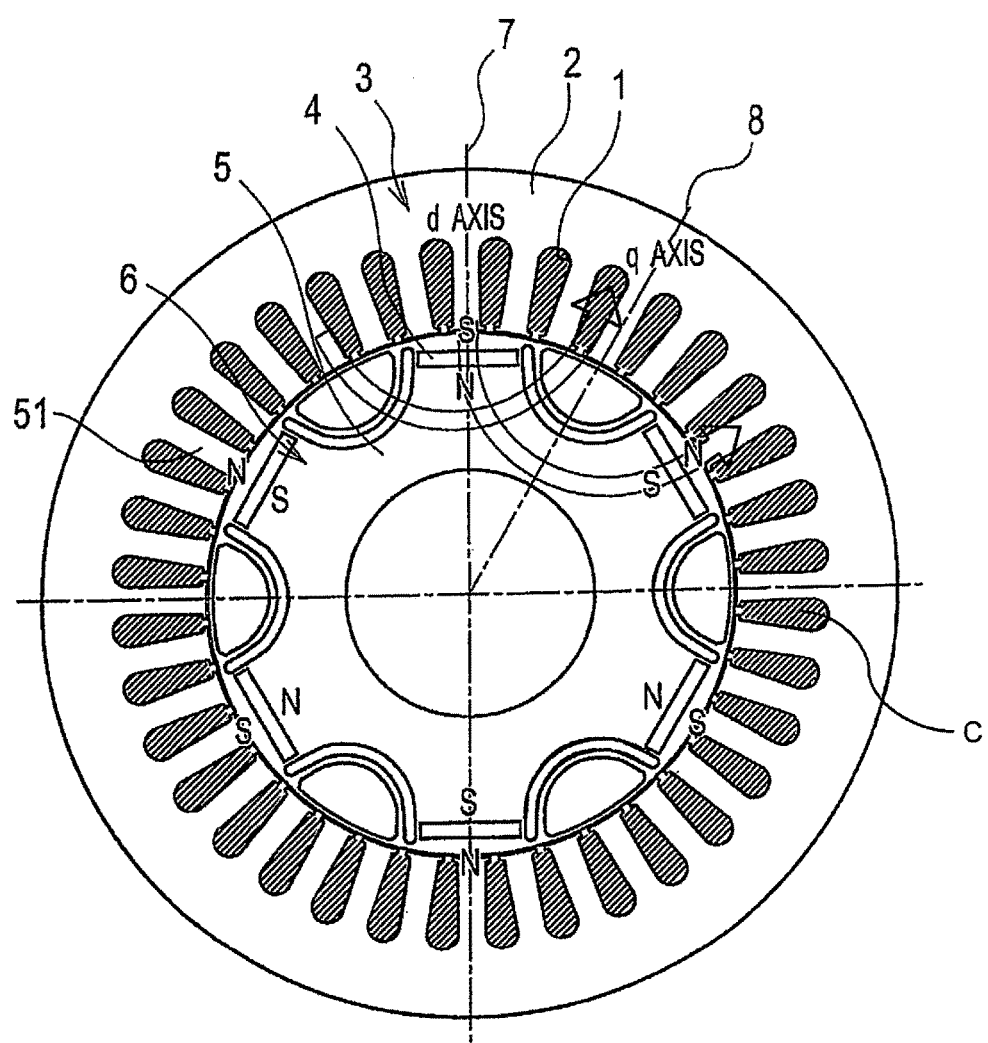
FIG. 1 is a diagram that shows the configuration of a rotary electric machine according to an illustrative embodiment.

Referring initially to FIG. 1, a rotary electric machine is illustrated in accordance with one illustrative embodiment. The rotary electric machine has a plurality of slots 1 formed by a stator core 2. The rotary electric machine includes an annular stator 3 and a rotor 6, which is positioned on the inner circumferential side of the stator 3. The rotary electric machine is coaxial with the stator 3, as shown in FIG. 1. An air gap is formed as a clearance between the stator 3 and the rotor 6.

The stator 3 includes the stator core 2 and a plurality (e.g., 36) of teeth 51 that protrude from the stator core 2 toward the inner circumferential side. The spaces between the adjacent teeth 51 form the slots 1. Stator winding C is wound on the teeth 51. The stator core 2 is formed from, e.g., laminated steel plates.

The rotor 6 has a rotor core 5. The rotor core 5 is formed in a tubular shape using a so-called laminated steel-plate structure, in which plates of steel, which is a metal having high magnetic permeability, are laminated together. Six permanent magnets 4 are provided along the circumferential direction to circumferential parts of the rotor core 5 that are opposite the stator 3. The permanent magnets are provided at equal intervals so that adjacent permanent magnets 4 have opposite polarity from each other.

Gaps are provided to corresponding portions of the rotor core 5, and the permanent magnets 4 are fit in place into these gaps. In the present embodiment, a geometric magnet center 7 is defined as the d-axis, and a position 8 that is an electric angle of 90° from the d-axis is defined as the q-axis (three pairs of poles are used in the present embodiment, and the position is therefore a mechanical angle of 30°).

Figure 2:
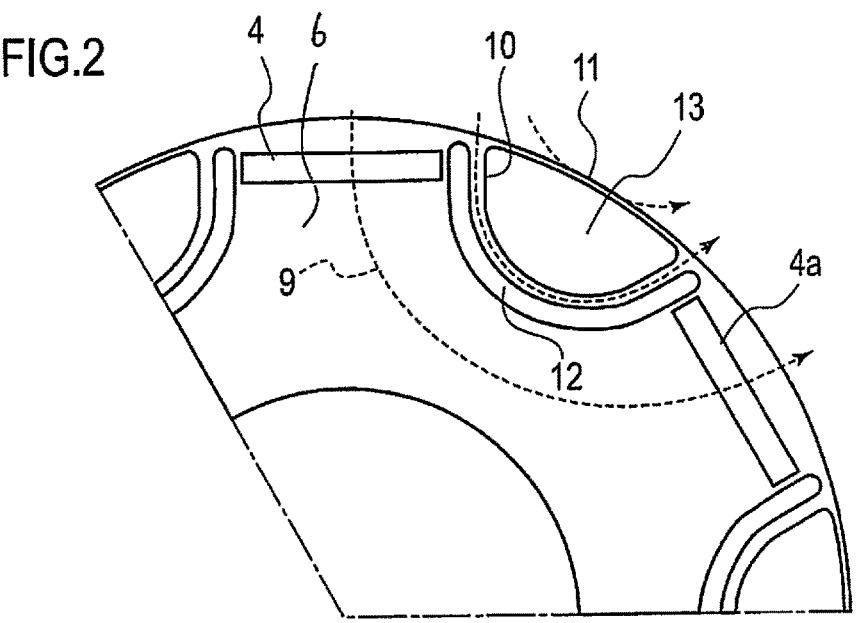
FIG. 2 is a diagram that shows the primary components of the rotor of the rotary electric machine according to the illustrated embodiment.
Figure 3:
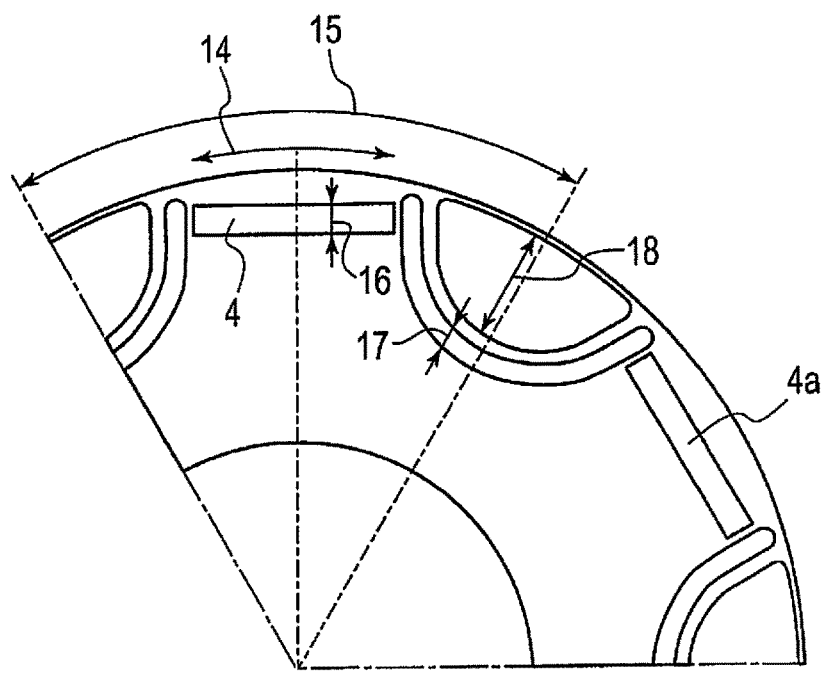
FIG. 3 is a diagram that shows the primary components of the rotor of the rotary electric machine according to the illustrated embodiment.

FIGS. 2 and 3 are descriptive diagrams that show the primary components of the rotor 6. The detailed configuration of the rotor 6 will be described below with reference to FIGS. 2 and 3. Internal magnetic gap parts 12 that form arcuate shapes inverted relative to the arc of the outside circumferential part of the rotor 6 are formed between the permanent magnets 4 and permanent magnets 4a that are adjacent thereto. The "magnetic gap parts" are areas composed of resin, air, or another material that has a relative permeability near 1.

External magnetic gap parts 13, the peripheral parts of which form arcuate shapes along the arc of the outside circumferential part of the rotor 6, are formed on the outside circumference of the internal magnetic gap parts 12. The spaces between the internal magnetic gap parts 12 and the external magnetic gap parts 13 are inside d-axis bypasses 10, and the outside circumferential parts of the external magnetic gap parts 13 are outside d-axis bypasses 11. The inside d-axis bypasses 10 form inverted arcuate shapes, and the outside d-axis bypasses 11 form arc shapes.

The d-axis magnetic paths are formed by magnetic paths 9 that pass through the thin permanent magnets 4, the inside d-axis bypasses 10 that do not include the permanent magnets 4 in the path, and the outside d-axis bypasses 11. The d-axis magnetic resistance is therefore determined by the magnetic paths 9, the inside d-axis bypasses 10, and the outside d-axis bypasses 11. The internal magnetic gap parts 12 are provided between the magnetic paths 9 and the inside d-axis bypasses 10, and the external magnetic gap parts 13 are provided between the inside d-axis bypasses 10 and the outside d-axis bypasses 11, and leakage of magnetic flux between the magnetic paths 9 and the inside d-axis bypasses 10 and between the inside d-axis bypasses 10 and the outside d-axis bypasses 11 is therefore limited.

Magnets having a coercivity small enough to allow complete magnetization by a magnetic field equal to or less than the armature reaction that can be produced by the system inverter are used as the permanent magnets 4 positioned on the magnetic paths 9 in the d-axis paths. Specifically, Al—Ni—Co, Sm—Co, Fe—Cr—Co, or other magnetic materials having a coercivity of approximately 100 to 200 kA/m can be employed. However, these coercivities differ according to the inverter system and the magnetic circuit design. A circumferential length 14 of the permanent magnets 4 is set so as to be no more than 50% of a circumferential length 15 of a single pole in the rotor 6, as shown in FIG. 3. For example, as seen in FIG. 3, each of the permanent magnets 4 has a width of no more than 50% of a length (corresponding to the circumferential length 15 of FIG. 3) of a single pole in the rotor 6 as measured in a circumferential direction of the rotor 6. By this structure, the permanent magnets 4 are arranged such that each of the permanent magnets 4 has a ratio of a circumferential length of an interlinking part of each of the permanent magnets 4 with respect to a length of a single pole on a circumference of the rotor 6 that is approximately 50% or less. The interlinking part is a part in which a magnetic flux of each of the permanent magnets 4 interlinks with the stator 3.

The value that results from adding a radial width 17 of the internal magnetic gap parts 12 that influence the q-axis magnetic resistance and a radial width 18 of the external magnetic gap parts 13 is set to be greater than a radial thickness 16 (i.e., a dimension of the permanent magnet in a magnetization direction) of each of the permanent magnets 4, which thickness is equal to the magnetic gaps in the d-axis. According to this configuration, the d-axis magnetic resistance is less than the q-axis magnetic resistance in the rotary electric machine according to the present embodiment. In other words, the relationship between a d-axis inductance Ld and a q-axis inductance Lq is set so that Ld>Lq.

In the rotary electric machine according to the present embodiment, high-cost permanent magnets such as high-coercivity permanent magnets and thick permanent magnets are not employed. Thin, low-coercivity magnets are employed so as to allow re-magnetization using the stator winding and system power control. The magnetic force is reduced, and voltage is limited in high-rotation zones in which normal motors require flux weakening control. Re-magnetization is performed in zones that require low rotation and high torque, and the desired magnetic flux is obtained in the magnets.

Demagnetization occurs due to the armature reaction upon application of a torque current (q-axis current) when a magnet having lower coercivity is used in a normal motor. In order to resolve this issue, the magnetic gap parts 12 and 13 are provided to the q-axis in the present embodiment, whereby the q-axis magnetic resistance is increased, the field that results from the q-axis current and that is diamagnetic with respect to the permanent magnets 4 is reduced, the pole arc ratio is limited to 50% or less, the permanent magnets 4 are positioned only at portions where the armature reaction is comparatively small, and the influence of the armature reaction is lessened.

As a result, the magnetized state of the permanent magnets 4 can be maintained upon a q-axis application (upon applying a torque current) even in cases where the permanent magnets 4 that are used have low coercivity. Situations sometimes occur in which an electric current greater than the rated current temporarily flows in conditions in which a large torque is momentarily needed, but in such cases a positive d-axis current (in the direction of increasing magnetization) is also made to flow, whereby a torque can be produced while the demagnetization of the permanent magnets 4 is avoided. The important points are that the stator 3 according to the present embodiment provides the outside d-axis bypasses 11 and the inside d-axis bypasses 10, which are wider than the outside d-axis bypasses, and that the internal magnetic gap parts 12 and the external magnetic gap parts 13 are provided on the q-axis magnetic paths, whereby the characteristics are such that Ld>Lq.

For example, the article "Principles And Fundamental Theory Of Variable-Magnetic-Force Memory Motors" (21$^{st}$ Meeting of the Institute of Electric Engineers of Japan) proposes that under high loads a positive d-axis current flows, and magnetization is maintained, but because the characteristics are such that Ld<Lq, a reluctance torque is produced in the opposite direction from the magnet torque when a positive d-axis current is applied, and the maximum torque is reduced.

In the present embodiment, the characteristics are such that Ld>Lq, which is opposite from the aforementioned article, and therefore a reluctance torque can be obtained in the same direction as the magnet torque, and the combined torque can be increased. A positive reluctance torque can be obtained while maintaining the magnetization of the permanent magnets 4, and therefore the efficiency of the motor can be increased as a result.

In other words, in order to make effective use of the magnet torque and the reluctance torque in cases where the characteristics are such that Ld<Lq in a motor that varies the magnetic force during operation, the coercivity must be set comparatively high so that the low-coercivity permanent magnets 4 are not demagnetized even when a negative d-axis current is applied, which means that the current necessary for controlling magnetization and demagnetization is larger, and energy losses increase.

In contrast, in the rotary electric machine according to the present embodiment, the relationship is such that Ld>Lq, and therefore a reluctance torque that is more positive than the positive d-axis current in the direction of increasing magnetization is obtained, the permanent magnets 4 can have low coercivity, and the current capacity necessary for magnetization and demagnetization can also be low. In other words, expensive materials need not be used, and stable characteristics can be obtained.

Thus, in the rotary electric machine according to the present embodiment, the q-axis magnetic resistance is increased, the Ld>Lq characteristic is obtained, and the circumferential ratio (pole arc ratio) of the permanent magnets 4 is 50% or less, whereby costs are reduced, and magnetization can be maintained in the driven state even when the magnets are the readily available low-coercivity magnets.

When weak magnetic-field operation is used in zones of high rotation in a typical permanent-magnet motor, Dy or other expensive materials that do not readily supply stable power and have high coercivity are used so that the permanent magnets 4 are not demagnetized. However, the permanent magnets can be remagnetized in the present embodiment, and therefore the permanent magnets 4 that have low coercivity can be used.

The armature reaction increases with respect to the permanent magnets 4 at operating points that momentarily require torque equal to or greater than the rated current, but lagging-phase current control (in the direction of increasing magnetization) is performed, whereby magnetization can be maintained, and a positive reluctance torque is obtained due to the Ld>Lq characteristics, and therefore efficiency can be improved during periods of high load as compared to conventional variable magnetomotive force electric motors.

Figure 4:
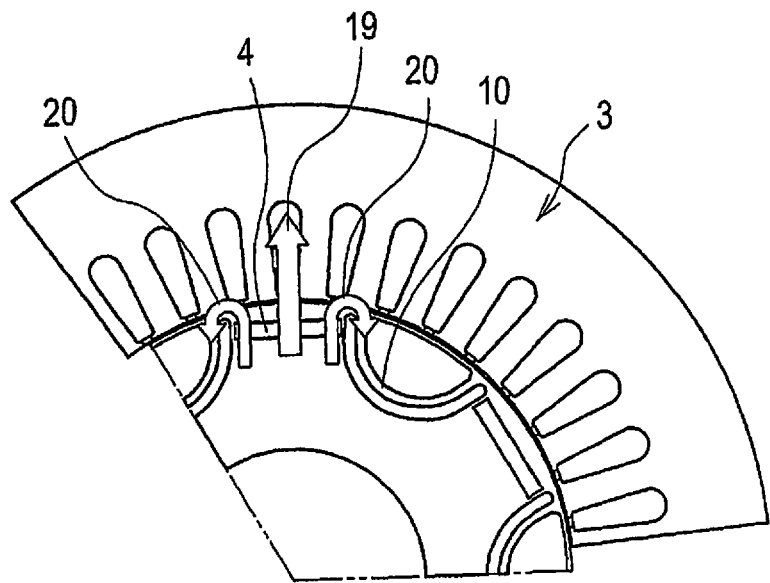
FIG. 4 is a diagram that shows the flow of magnetic flux of the rotary electric machine according to the illustrated embodiment in a no-load state.

The magnetic flux generated by the rotary electric machine will be described next. FIG. 4 is a descriptive diagram that shows the flow of magnetic flux generated in a no-load state in which no current is applied. As shown in FIG. 4, the magnetic flux outputted from the permanent magnets 4 is divided into a magnetic flux 19, which flows toward the stator 3 and interlinks with the stator winding (not shown in the drawings), and a magnetic flux 20, which leaks through the inside d-axis bypasses 10 to the adjoining magnets that are on the left and right and have different polarity. In other words, in cases where the rotor 6 is made to rotate in a no-load state, the magnetic flux that interlinks with the stator 3 is less than in cases where leakage does not occur (cases where the inside d-axis bypasses 10 are not provided), and therefore the iron loss that occurs within the stator 3 is lessened.

Figure 5:
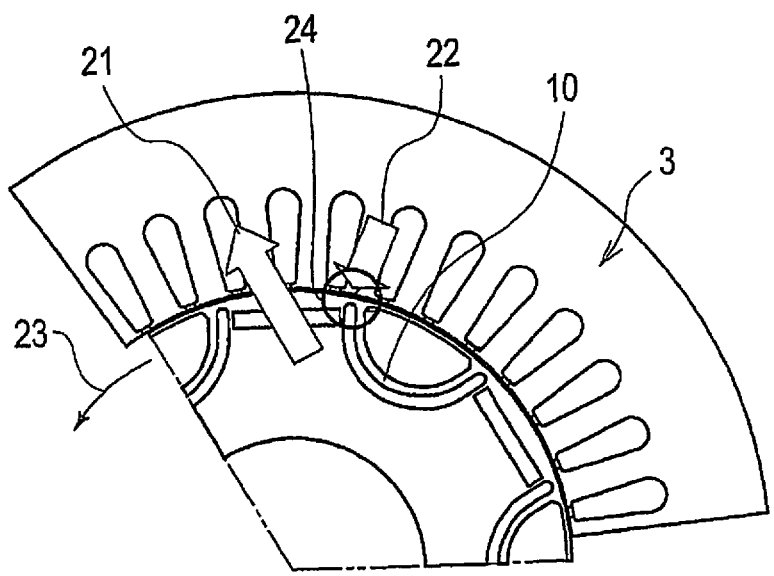
FIG. 5 is a diagram that shows the flow of magnetic flux of the rotary electric machine according to the illustrated embodiment when a q-axis current flows through the stator winding.

FIG. 5 is a descriptive diagram that shows the flow of magnetic flux when a q-axis current flows to the stator winding. As shown in FIG. 5, a magnetic flux 21 that is outputted from the permanent magnets 4 inclines from the stator 3 toward the rotational direction 23 due to an armature reaction 22. The armature reaction 22 acts in a direction to impede the magnetic flux in the magnets from leaking to the inside d-axis bypasses 10. The amount of magnetic flux that flows through the bypass hubs 24 linked to the outside d-axis bypasses 11 and the inside d-axis bypasses 10 decreases with increased q-axis current.

Figure 6:
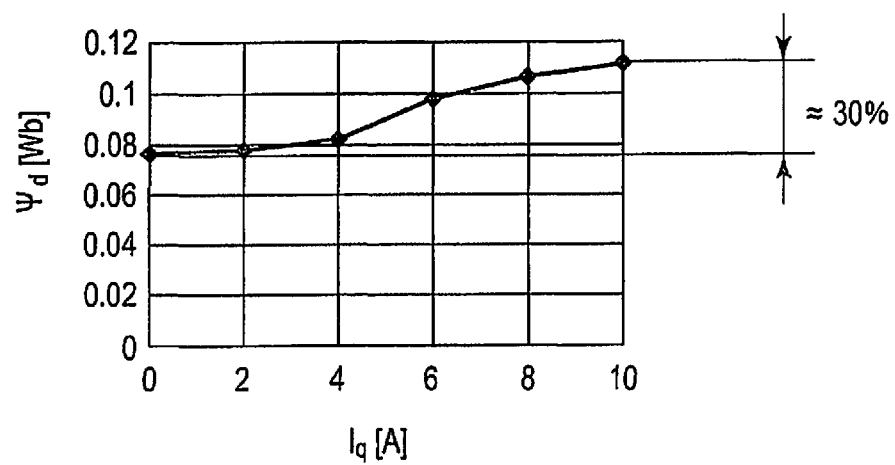
FIG. 6 is a characteristic diagram that shows the relationship between the value of the q-axis current and the inter-linkage magnetic flux of the stator winding.

FIG. 6 is a characteristic diagram that shows the relationship between the q-axis current value and the interlinkage magnetic flux of the stator winding. The horizontal axis shows the q-axis current Iq (A), and the vertical axis shows the interlinkage magnetic flux Ψd (Wb).

When comparing the interlinkage magnetic flux under no load and under a rated load in the present embodiment, it can be seen that a controlled change of 30% in magnetic flux can be achieved by applying the q-axis current. In other words, the magnetic flux of the permanent magnets 4 in low-load zones in which large torque is unnecessary is automatically limited, and stator iron loss is reduced. In high-load zones that require large torque, the applied q-axis current and the leakage of magnetic flux to the inside d-axis bypasses 10 are limited, and the magnetic flux that interlinks with the stator 3 increases as a result, and the needed torque can therefore be obtained. The state of magnetization of the permanent magnets 4 does not change at this time, and therefore the amount of interlinkage of the magnetic flux in the magnets can be varied by approximately 30% by controlling only the q-axis current Iq. While the amount of interlinkage of the magnetic flux in the magnets can be varied by approximately 30%, it will be apprarent from this disclosure that the amount of interlinkage of the magnetic flux in the magnets can be varied by approximately 10% or more if needed and/or desired.

From the perspective of mechanical strength, the centrifugal force generated in the inside d-axis bypasses 10 and the outside d-axis bypasses 11 is supported by the bypass hubs 24 on both ends. However, the bypass hubs 24 are set to have a large width in order to cause leakage of a certain amount of magnetic flux during periods of no load, and therefore the mechanical strength can also be improved as a result.

In the present embodiment, the magnetic flux of the magnets leaks through the inside d-axis bypasses 10 during periods of no load and in zones of low required torque and low load current, and therefore the magnetic flux that interlinks with the stator 3 is reduced. Iron loss is therefore reduced, and efficiency is improved.

The outside d-axis bypasses 11 are provided to the vicinity of the air gaps of the rotor 6, and therefore, along with increasing the load current, the diamagnetic field in the bypass hubs 24 is increased, the amount of magnetic flux of the magnets that leaks to the d-axis bypasses 10 and 11 is reduced, and the magnetic flux that interlinks with the stator 3 increases. An adequate amount of the magnetic flux of the magnets is therefore obtained during rotation at high torque. The strength necessary to support the centrifugal force acting on the d-axis bypasses 10 and 11 is also obtained.

Figure 7:
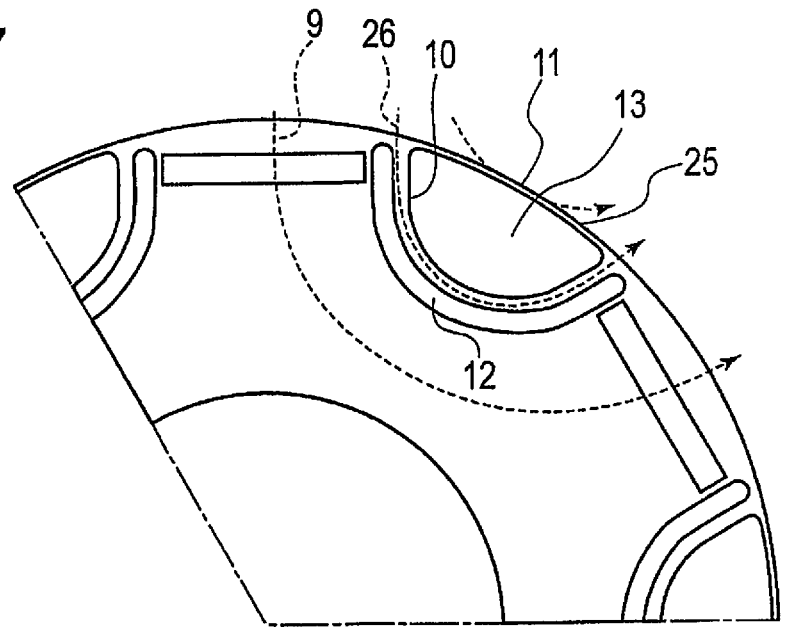
FIG. 7 is a diagram that shows the primary components of the rotor of the rotary electric machine according to the illustrated embodiment.

As shown in FIG. 7, among the two d-axis bypasses 10 and 11 in the present embodiment, the outside d-axis bypasses 11 are positioned along a circular shape 25 of the outside shape of the rotor, and the inside d-axis bypasses 10 are positioned along a d-axis flux-line shape 26 that is a substantially inverted arc with respect to the arc of the outside shape of the rotor. As described above, the inside d-axis bypasses 10 function as leakage paths for controlling the amount of magnetic flux of the permanent magnets 4 and function to reduce the d-axis magnetic resistance. On the other hand, the outside d-axis bypasses 11 that are disposed on the front surface of the rotor influence the characteristics of sensorless control of the salient-pole-ratio detecting type and the torque-ripple performance.

The difference in permeance between the d-axis and the q-axis on the rotor 6 when viewed from the stator 3 decreases when the width of the outside d-axis bypasses 11 is increased, and therefore the estimation accuracy in sensorless control for using this difference to estimate the positions of the magnetic poles decreases. Making the width of the outside d-axis bypasses 11 as small as possible is therefore preferable from the perspective of improving the estimation accuracy of the positions of the magnetic poles. On the other hand, from the perspective of reducing torque ripple, reducing permeance pulses is effective, and therefore ensuring a given bypass width is useful. In the stator 3 of the rotary electric machine according to the present embodiment, the width is such that both reduced torque ripple and the required estimation accuracy for sensorless control can be obtained.

The outside d-axis bypasses 11 are thus provided in the rotary electric machine according to the present embodiment, whereby fluctuations in the magnetic flux at the air gap parts can be smoothed out, and torque ripple can be reduced while ensuring the Ld>Lq characteristics. Reducing the width of the outside d-axis bypasses 11 allows performance reductions of sensorless control of the type that detects the saliency of the rotor 6 to be limited, and providing the inside d-axis bypasses 10 allows the Ld>Lq characteristics and the leakage characteristics of the magnetic flux of the magnets to be ensured.

Figure 8:
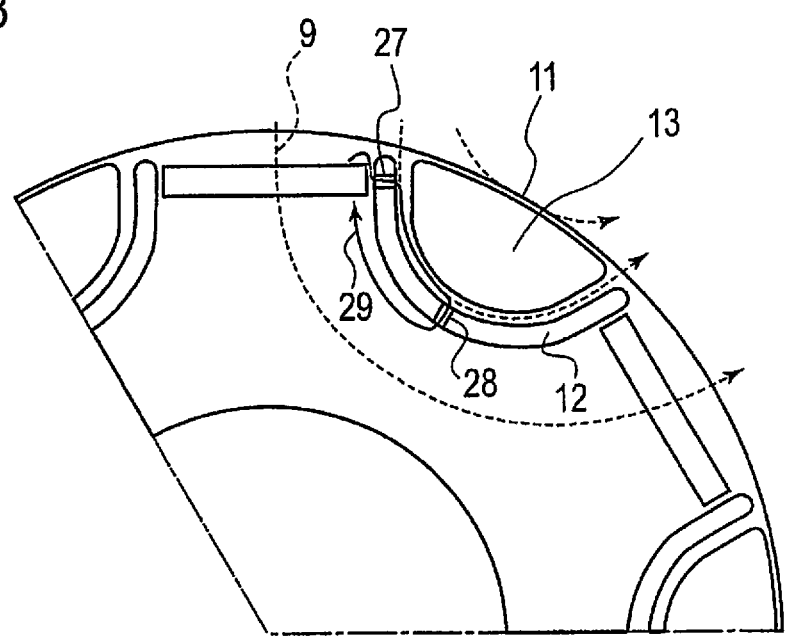
FIG. 8 is a diagram that shows the changes in the magnetic paths of the rotary electric machine according to the illustrated embodiment in cases where a magnetic-path-connecting part is provided to the d-axis magnetic path.

In the present embodiment, the external magnetic gap parts 13 are provided to the spaces between the outside d-axis bypasses 11 and the inside d-axis bypasses 10 of the rotor 6, and the internal magnetic gap parts 12 are provided to the spaces between the inside d-axis bypasses 10 and the permanent magnets 4, as shown in FIG. 7. This positioning allows each of the magnetic circuits to form independent magnetic paths. If it is supposed that areas for connecting the magnetic paths are positioned as shown by reference numerals 27 and 28 in FIG. 8, a leakage magnetic flux 29 in which the flux of the permanent magnets 4 turns from the front surface of the magnets through the areas 28, 29 to the rear surface of the magnets will increase. The leakage magnetic flux 29 cannot be controlled using the q-axis current, and the magnetic flux is therefore simply lost. The configuration in the present embodiment is such that the d-axis bypasses 10 and 11 and the magnetic paths 9 are linked only at the vicinity of the surface of the rotor 6, and therefore such losses can be limited.

The large external magnetic gap parts 13 are thus present between the outside d-axis bypasses 11 and the inside d-axis bypasses 10, which form an inverted arcuate shape, and therefore the magnetic flux from the stator 3 does not interfere with the d-axis magnetic paths that include the permanent magnets 4. The armature reaction can thereby be prevented from influencing the magnetization state. Magnetic circuits resulting from magnetic materials are not present between the magnetic paths 9, which pass through the permanent magnets 4, and the d-axis bypasses 10 and 11 that are adjacent to those paths, and therefore the amount of leakage magnetic flux that turns from the front surface of a magnet to the rear surface of the same magnet can be limited.

Figure 9:
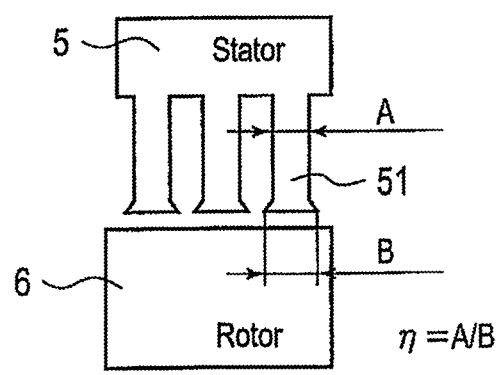
FIG. 9 is a diagram that shows the teeth provided to the stator core of the rotary electric machine according to the illustrated embodiment.

As shown in FIG. 9, in the present embodiment, the ratio $\eta(=A/B)$ of the width A of the teeth 51 formed on the stator core 2 and the width B of the distal end parts of the teeth is set in a range such that $0.7 \leq \eta < 1.0$. Such a configuration allows reductions in magnetic field strength to be limited even in cases where the stator core 2 is magnetically saturated.

In other words, in cases where the ratio η(=A/B) of a first tooth width A of the teeth 51 formed on the stator core 2 and a second tooth width B of the distal end parts of the teeth 51 is 1 (when the width of the teeth 51 is constant from the base to the distal end), the density distribution of magnetic flux in the teeth 51 is substantially constant. The density of magnetic flux in the portions that implement the stator winding increases according to decreases in the ratio η. Significant problems are not presented in rotary electric machines in which the magnetic flux density is not particularly great, but care is required in the rotary electric machine according to the present embodiment, which is such that the stator winding is used for magnetization and demagnetization during operation.

In particular, in the magnetization process, a magnetic field must be applied until a permanent magnetic field is formed in the interior of the magnet, but the magnetic permeability of the stator core 2 decreases according to the magnetic saturation of the stator core 2, and therefore the desired magnetic field strength is not obtained. The ratio η is therefore set in a range such that 0.7≤η<1.0 when using the stator winding to magnetize and demagnetize the permanent magnets 4 in the present embodiment, whereby reductions in magnetic field strength are limited.

In cases where current is passed through the stator winding and magnetization is performed in conventional magnets, a magnetizing field that is larger than the typical rated current must thus be applied, and therefore the portions that implement the winding, which portions are the narrowest portions of the teeth 51, are easily saturated. The magnetic permeability decreases when these portions are saturated, and therefore the magnetic field necessary for magnetization is not obtained, even when the applied current is large. To the extent that the width of the distal-end portions of the teeth 51 is larger than the winding parts, the amount of magnetic flux that is trapped by the distal ends of the teeth 51 increases, and the saturation of the winding parts becomes more pronounced. The ratio η in the present embodiment is set such that 0.7≤η<1.0, whereby the magnetic saturation of the teeth 51 is lessened, and the necessary magnetizing field can be more readily obtained.

The thickness and coercivity of the permanent magnets 4 in the present embodiment are determined using the method described below. Specifically, when the specifications of the stator winding that is wound on the teeth 51 of the stator core 2 and a maximum current value I of the power source are determined, the thickness and coercivity of the permanent magnets 4 required to implement magnetization and demagnetization are determined using those conditions.

Figure 10:
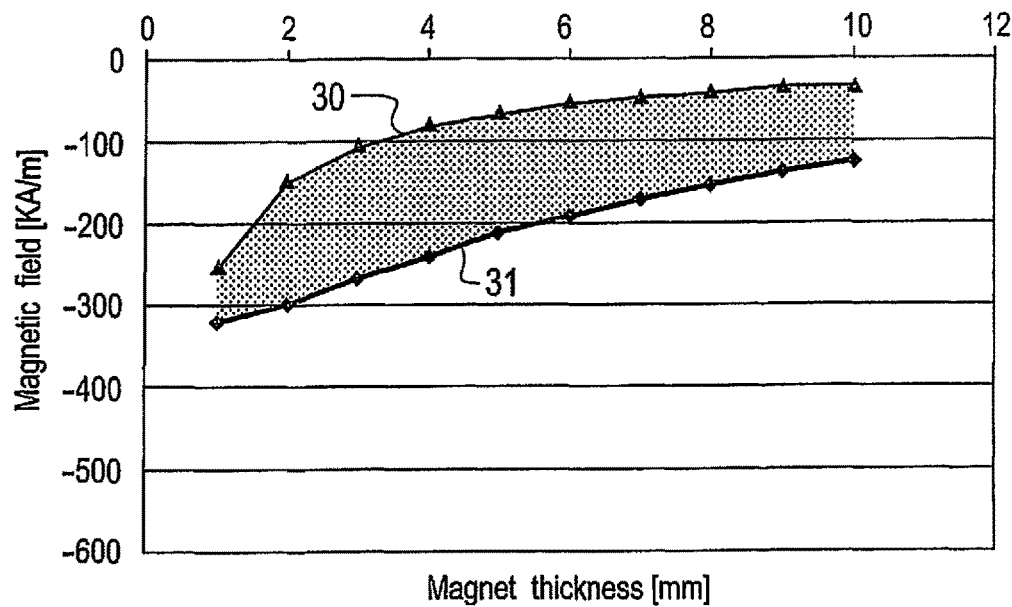
FIG. 10 is a characteristic diagram that shows the relationship between the thickness and the retentivity of the permanent magnet used in the rotary electric machine.

FIG. 10 is a characteristic diagram that shows the relationship between the thickness of the permanent magnets 4 and the coercivity of the permanent magnets 4. The minimal required coercivity and the thickness of the permanent magnets 4 must be such that demagnetization does not occur in pulsating permeance during no-load rotation. The necessary conditions are those under the curve indicated by reference numeral 30 in the graph shown in FIG. 10. The curve indicated by reference numeral 30 can be given by Equation (1) below on the basis of the coercivity (Hcj(kA/m)) and magnet thickness (tm (mm)) of the permanent magnets 4.

$$Hcj = -(1.05 * tm)^2 + 33.8 * tm - 359 \quad (1)$$

The requirements for the maximum permissible coercivity and thickness of the permanent magnets 4 are given by the conditions above the curve indicated by reference numeral 31 in the graph. The curve indicated by reference numeral 31 can be given by Equation (2) below.

$$Hcj = (-243/tm) - 17 \quad (2)$$

The relationship between the coercivity (Hcj) and the magnet thickness (tm) of the permanent magnets 4 is therefore preferably set in the range given by Equation (3) below.

$$-(1.05*tm)^2 + 33.8*tm - 359 < Hcj < (-243/tm) - 17 \quad (3)$$

It shall be apparent that designs outside the bounds of Equation 3 are also possible, but larger current sources are necessary in such cases, leading to cost increases.

If the number of coil turns on the stator and the current capacity are not limited, then the magnetization state can essentially be controlled using the stator current, regardless of the coercivity and magnet thickness of the permanent magnets 4. However, in cases of deviation from the range given by Equation (3), an extremely large current is required for magnetization, and maintaining magnetization under load becomes difficult. In the present embodiment, the relationship between the retentivity and thickness 16 of the permanent magnets 4 is made to satisfy Equation (3), whereby the inverter capacity can be prevented from becoming unnecessarily large.

Figure 11:
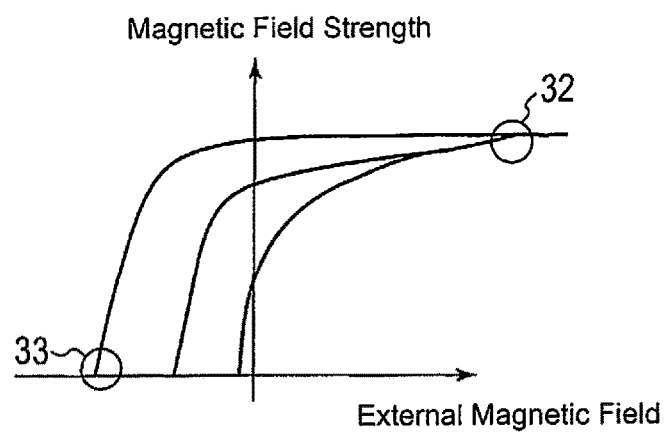
FIG. 11 is a characteristic diagram that shows the relationship between the external magnetic field and the magnetic-field strength in cases where a nucleation-type magnet is used as the permanent magnet.
Figure 12:
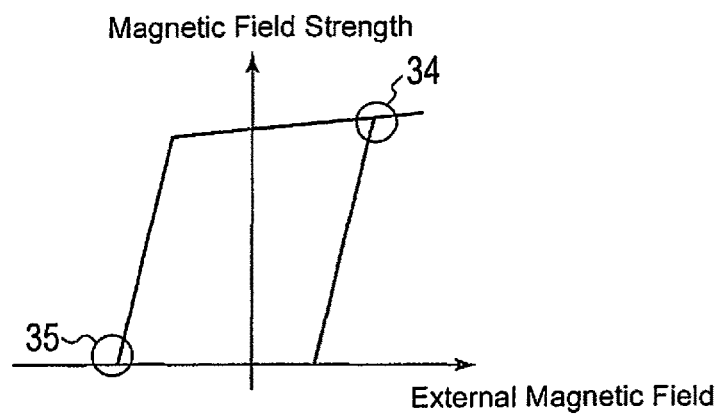
FIG. 12 is a characteristic diagram that shows the relationship between the external magnetic field and the magnetic-field strength in cases where a pinning-type magnet is used as the permanent magnet.

The configuration of the present embodiment is such that pinning-type magnets and not nucleation-type magnets are used as the permanent magnets 4. FIG. 11 is a characteristic diagram that shows the relationship between the external magnetic field and the magnetic-field strength for a nucleation-type magnet. As shown in FIG. 11, a magnetic field strength 32 required for complete magnetization in a nucleation-type magnet is larger than a coercivity 33, and a large magnetization current is required as a result. On the other hand, FIG. 12 is a characteristic diagram that shows the relationship between the external magnetic field and the magnetic-field strength for a pinning-type magnet. As shown in FIG. 12, a magnetic field strength 34 required for complete magnetization in a pinning-type magnet is at substantially the same low level as a coercivity 35. The minor loop characteristics are also close to linear, and the magnetization state can therefore be readily controlled.

The current that flows to magnetize and demagnetize the permanent magnets 4 differs from the current for producing torque and should flow for as short a time as possible (the current should be made to flow in pulses) from the standpoint of limiting the energy losses that accompany magnetization and demagnetization. However, when the current is made to flow in pulses, an eddy current oriented so as to impede the magnetization field obtained thereby is produce within the permanent magnets 4. The performance of magnetization and demagnetization is impeded, and the magnetization distribution may also become irregular. Larger currents are necessary to overcome these reactions and perform magnetization and demagnetization, leading to cost increases.

The use of split magnets is accordingly more preferable in order to solve these problems and reduce eddy-current losses within the permanent magnets 4 due to pulse currents for magnetization and demagnetization. The use of, e.g., bond magnets, in which an insulating binder is used to bind magnetic powder, is also effective.

A magnetic field having the strength necessary to change the magnetization state should thus be employed, but the magnetization current does not contribute to mechanical output and leads to losses, and therefore the period during which the current flows should be as short as possible. On the other hand, when the period of current flow is shortened, the eddy currents produced within the permanent magnets 4 impede the magnetization field. Magnetization is therefore inadequate, and, depending on the area, the magnetization state may be irregular. Splitting the permanent magnets 4 or increasing resistance by binding can therefore limit the production of eddy currents within the magnets and allow the magnets to be readily magnetized and demagnetize. Energy consumption can also be limited.

The number of coil turns in the stator winding in the present embodiment is set so that the induced voltage at the target rotational speed of the system exceeds the DC voltage of the system in cases where the permanent magnets 4 provided to the rotor 6 are completely magnetized and weak magnetic-field control is not performed.

Figure 13:
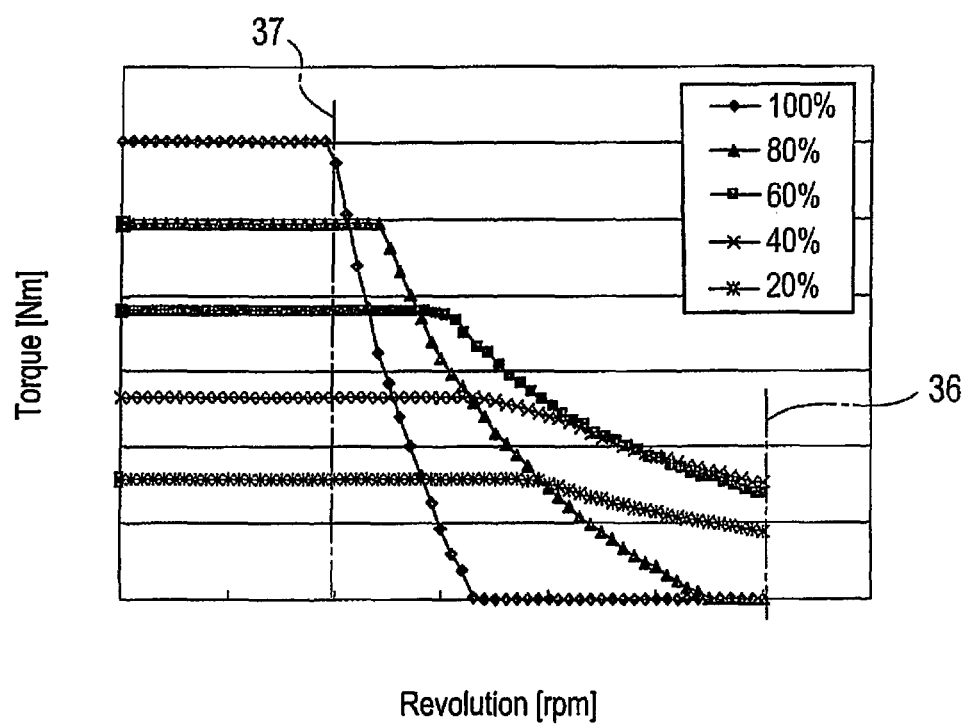
FIG. 13 is a characteristic diagram that shows the relationship between rotational speed and torque for various magnetization levels in the rotary electric machine according to the illustrated embodiment.

FIG. 13 is a characteristic diagram that shows the relationship between rotational speed and torque when the level of magnetization is 100%, 80%, 60%, 40%, and 20%. As shown in FIG. 13, in cases where the target rotational speed of the system is that shown by reference numeral 36, the desired torque cannot be produced due to induced voltage exceeding the system voltage when the permanent magnets are in a state of 100% magnetization.

However, in the rotary electric machine according to the present embodiment, in which the magnetic force can be changed, a design that allows output up to the target rotational speed 36 at 100% magnetic force leads to reductions in torque in zones of low rotation. In order improve torque in zones of low rotation, the design is therefore preferably such that the induced voltage surpasses the DC voltage of the system at least when at or below the target rotational speed (reference numeral 37). As shown in FIG. 13, the system can be driven while changing the level of magnetization in such cases, whereby low-speed torque and high-speed rotation can both be obtained, and the range of outputs can be increased.

Limits are thus placed on the maximum torque in zones of low rotation when the number of coil turns is set so that the induced voltage does not exceed the DC voltage of the system in zones of high rotation in states of complete magnetization. The number of coil turns is set under the assumption that the magnetization state can be varied, whereby large torque at low speed and high speed rotation can both be obtained.

Figure 14:
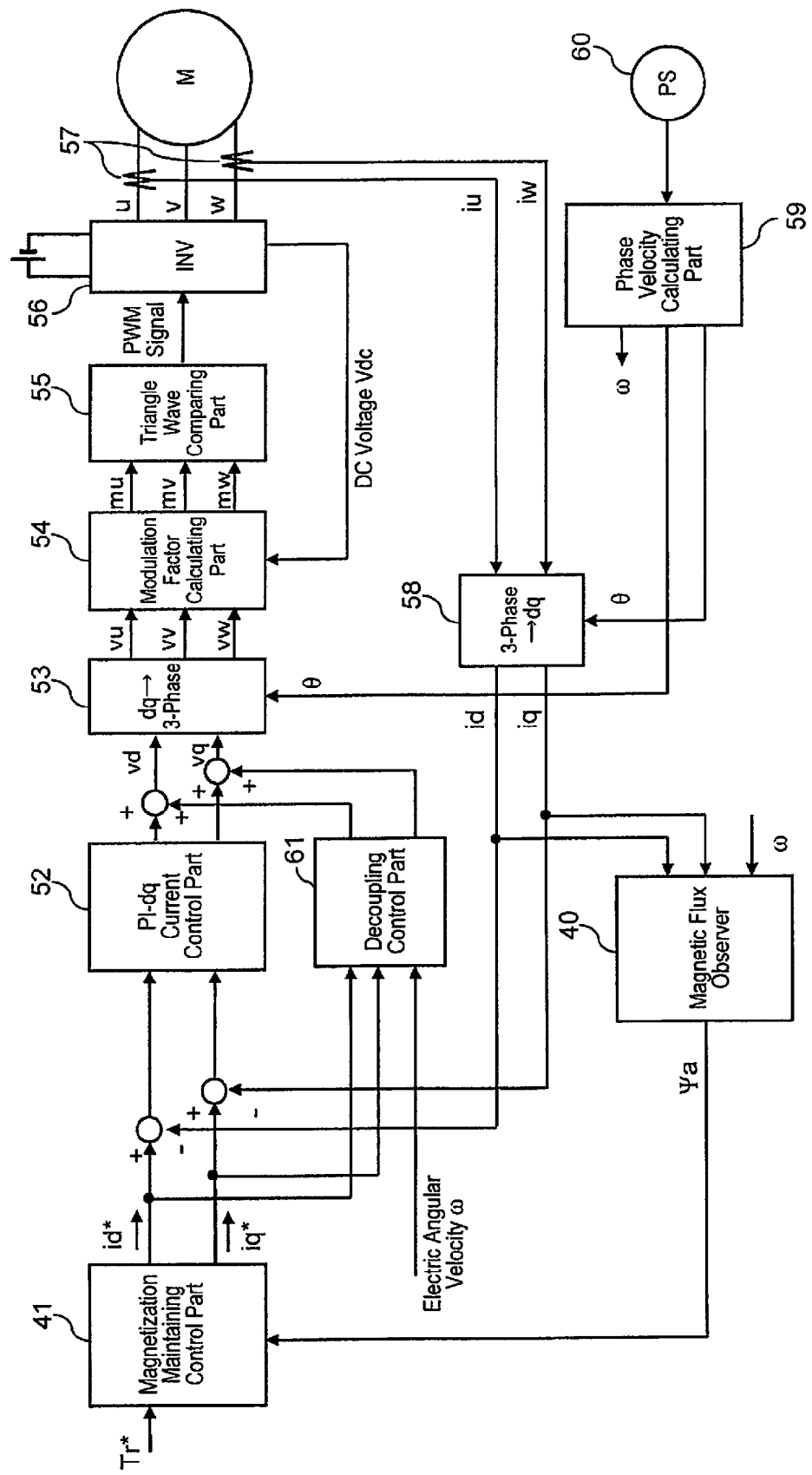
FIG. 14 is a block diagram that shows the configuration of the control device of the rotary electric machine according to the embodiment of the present invention.

A control device for the rotary electric machine according to the present invention will be described next. FIG. 14 is a block diagram of the control device. As shown in FIG. 14, when dq-axis command values id*, iq* are received, the deviation between these command values and dq-axis current values id, iq is calculated, and the calculated deviation is supplied to a PI-dq current controller 52. The deviation is corrected by the PI-dq current controller 52. In the PI-dq current controller 52, dq-axis voltage command values Vd*, Vq* are calculated on the basis of the corrected deviation.

A decoupling control part 61 determines dq-axis interference voltage command values vd' and vq' on the basis of the id command value id*, the iq command value iq*, and an electric angular velocity ω, and adds the result to the dq-axis voltage command values Vd*, Vq*, whereby corrected dq-axis voltage command values Vd, Vq are determined and outputted to a dq-3-phase transforming part 53.

The dq-3-phase transforming part 53 calculates 3-phase voltage command values Vu, Vv, Vw on the basis of the dq-axis voltage command values Vd, Vq and a rotor phase angle θ of the motor. Modulation factors mu, mv, mw are determined by a modulation-factor-calculating part 54 on the basis of a DC voltage Vdc of an inverter 56.

A triangle-wave-comparing part 55 compares the modulation factors mu, mv, mw with triangle waves, whereby a PWM signal is generated. The PWM signal is outputted to the inverter 56. The inverter 56 controls a switch circuit (not shown in the drawings), which is composed of an upper arm and a lower arm, on the basis of the PWM signal, whereby a three-phase alternating current signal is generated from the direct-current voltage and outputted to a motor M. The motor M in which the rotary electric machine according to the present embodiment has been applied can thereby be driven to rotate.

A current sensor 57 is provided to the U-phase and W-phase of the output of the inverter 56. Currents iu and iw detected by the current sensor 57 are supplied to a 3-phase-dq transforming part 58. A resolver or other rotational-angle sensor 60 is provided to the motor M, and the output signal thereof is supplied to a phase-velocity-calculating part 59. In the phase-velocity-calculating part 59, the phase angle θ of the motor M is determined and outputted to the 3-phase-dq transforming part 58 and the dq-3-phase transforming part 53. The rotational speed ω of the motor M is calculated, and the calculated rotational speed ω is outputted to a magnetic-flux-observer 40.

The 3-phase-dq transforming part 58 calculates the dq-axis current values id, iq on the basis of the U-phase, V-phase, and W-phase currents iu, iv and iw outputted from the inverter 56 and the phase angle θ of the motor M. The results of this calculation are supplied to the magnetic-flux-observer 40 and used in calculating the deviation of the dq-axis command values id* and iq*.

The magnetic-flux-observer 40 calculates a magnetization level $\Psi a$ on the basis of the dq-axis current values id and iq determined by the 3-phase-dq transforming part 58 and the rotational speed ω of the motor M as determined by the phase-velocity-calculating part 59, and outputs the calculated magnetization level to the magnetization-maintaining control part 41. The magnetization level $\Psi a$ is a total of the magnetic flux of the magnets interlinking with the stator. More specifically, the magnetic-flux-observer 40 calculates the magnetization level $\Psi a$ based on the dq-axis current values id, iq and the rotational speed ω using a preliminarily obtained motor voltage equation including a motor parameter, which is a conventionally-known technology used for predicting magnet temperature (see Japanese Unexamined Patent Publication No. 2004-201425-A, for example).

The magnetization-maintaining control part 41 outputs a combination of the dq-axis command values id*, iq* to produce the target torque based on a torque command value Tr* and the magnetization level $\Psi a$ outputted by the magnetic-flux-observer 40 as explained below. The rotary electric machine according to the present embodiment uses the low-coercivity permanent magnets 4, and the configuration is therefore such that the magnetization state of these magnets is changed according to the needs of the operating point. If the limiting conditions that allow the magnetization state to be maintained are not constantly ascertained in such instances, unexpected changes in magnetic force will occur, and the control will be unstable.

Figure 15:
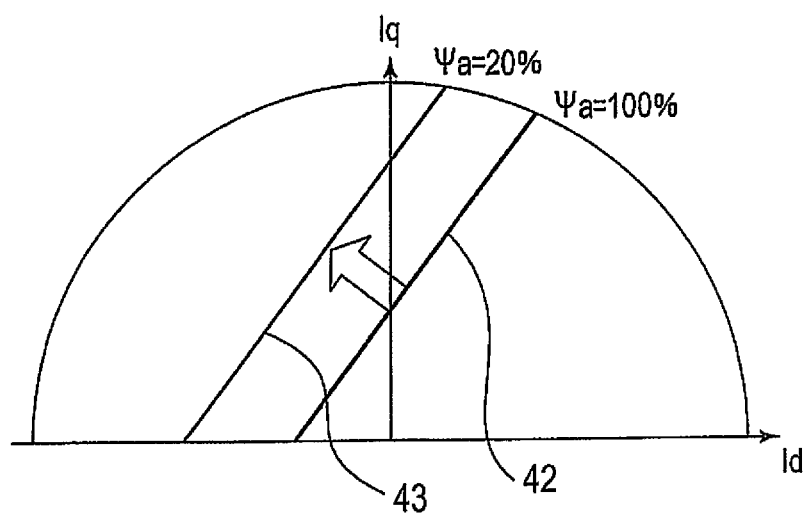
FIG. 15 is a characteristic diagram that shows the limit line for the retention of the magnetized state in the control device of the rotary electric machine according to the illustrated embodiment.

Accordingly, the magnetic-flux-observer 40 and the magnetization-maintaining control part 41 are provided in the control device of the rotary electric machine according to the present embodiment, in addition to the current-vector control block that is conventionally used. The magnetic-flux-observer 40 estimates the magnetic flux of the magnets on the basis of the dq-axis current values id and iq detected by the current sensor 57, the rotational speed ω of the motor M, and the parameters of the motor M. The magnetization-maintaining control part 41 controls the dq-axis current values id, iq so that the magnetization state can be maintained on the basis of the magnetic flux of the magnets. The magnetization state of the magnets can thereby be prevented from changing unexpectedly due to the required driving conditions, and stabilized control is enabled. The magnetization-maintaining control part 41 shown in FIG. 14 functions according to the control law expressed by the linear expression of Iq<α×id+β(Ψa) in the id-iq plane, as shown in FIG. 15.

In cases, where, e.g., the magnetization level Ψa equals 100%, the q-axis current Iq is controlled so as not to surpass a magnetization-maintaining limit line 42. In cases where Ψa=20%, Iq is controlled so as to not surpass a magnetization-maintaining limit line 43. Essentially, the magnetization-maintaining limit line moves in the upward direction when the magnetization level Ψa is low.

The limit line of the magnetization state can thus be simply controlled. In usage conditions where the operating point changes greatly, the changes in the magnetization states can be controlled under any conditions without complex calculations.

A rotary electric machine having six poles was described in the present embodiment, but the rotary electric machine can also be applied in the same fashion for differing numbers of poles.

Thus, while only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable magnetomotive force rotary electric machine comprising:
    an annular stator including a stator winding wound on a plurality of teeth; and
    a rotor having a circular shape that is concentric with the stator, and the rotor including at least one permanent magnet arranged in a d-axis magnetic path,
    the rotor including a magnetic gap part located between the at least one permanent magnet arranged in the d-axis magnetic path of one pole and an adjacent magnet with a different polarity, such that a d-axis magnetic flux forms a d-axis bypass passing through an area other than the at least one permanent magnet, and the d-axis bypass provides a magnetic resistance in a d-axis direction that is set below a magnetic resistance in a q-axis direction that is orthogonal to the d-axis resistance;
    the at least one permanent magnet having a coercivity providing for complete magnetization by a magnetic field equal to or less than an armature reaction that is produced by a power-supplying inverter, and the at least one permanent magnet having a ratio of a circumferential length of the at least one permanent magnet with respect to a length of a single pole on a circumference of the rotor that is 50% or less; and
    the magnetic gap part being arranged in a q-axis magnetic path, with a radial width of the magnetic gap part in a direction of the q-axis magnetic path being greater than a dimension of the at least one permanent magnet in a magnetization direction.

2. The variable magnetomotive force rotary electric machine according to claim 1, wherein
    the d-axis bypass is linked to the d-axis magnetic path adjacent an air gap that defines an annular clearance between the rotor and the stator such that 10% or more of magnetic flux of the at least one permanent magnet leaks through the d-axis bypass to the adjacent magnet having the different polarity in a no load state in which current is not applied to the stator winding.

3. The variable magnetomotive force rotary electric machine according to claim 2, wherein
    the d-axis bypass is formed from two bypasses that includes:
        a circularly shaped d-axis bypass positioned along a circular shape of an outside shape of the rotor; and
        an inverted-arcuate d-axis bypass positioned along a shape of a d-axis magnetic flux line so as to have an arcuate shape bent in a direction inverted with respect to an arcuate shape of the outside shape of the rotor.

4. The variable magnetomotive force rotary electric machine according to claim 2, wherein
    the teeth of the stator are configured so that a ratio $\eta(\eta=A/B)$ satisfies the relationship $0.7 \leq \eta < 1.0$, where A represents a width of a first tooth portion constituting a primary magnetic path for winding the stator winding, and B represents a width of a second tooth portion adjacent the rotor.

5. The variable magnetomotive force rotary electric machine according to claim 2, wherein
    a relationship between the coercivity (Hcj (kA/m)) of the at least one permanent magnet and a thickness (tm (mm)) of the at least one permanent magnet is set within a range given by a following equation: $-(1.05*tm)^2+33.8*tm-359 < Hcj < (-243/tm)-17$; and
    a maximal current amplitude necessary for magnetization is 2 I or less, and a maximal current amplitude necessary for demagnetization is 0.5 I or less, where I is a maximal current value for electric current to flow without a change in a magnetization state when no angle advance control is performed.

6. The variable magnetomotive force rotary electric machine according to claim 2, wherein
    the at least one permanent magnet includes characteristics of a pinning-type magnet.

7. The variable magnetomotive force rotary electric machine according to claim 2, wherein
    the at least one permanent magnet is either a split magnet having at least two or more magnet segments that are layered and joined via an insulating layer, or a bond magnet having an insulating material that binds a magnetic powder.

8. The variable magnetomotive force rotary electric machine according to claim 2, wherein
    a number of coil turns of the stator winding is set so that an induced voltage at the target rotational speed of a system exceeds a DC voltage of the system in cases where the at least one permanent magnet of the rotor is completely magnetized, and control other than flux weakening control is performed.

9. A control device for controlling the variable magnetomotive force rotary electric machine according to claim 2, the control device comprising:
- a magnetic-flux-observer configured to estimate a magnetization state of the at least one permanent magnet based on a voltage value or a current value supplied to the rotary electric machine;
- a magnetization-maintaining control part configured to correct a deviation between a dq-axis current command value and a dq-axis current value based on information about the magnetization state and parameters set in advance;
- a voltage-command-value-generating part configured to generate a voltage command value based on a deviation corrected by the magnetization-maintaining control part;
- an inverter configured to drive the rotary electric machine on based a PWM signal generated on based on the voltage command value; and
- a current sensor configured to measure a current value outputted by the inverter.

10. The variable magnetomotive force rotary electric machine according to claim 1, wherein
the d-axis bypass is formed from two bypasses that includes:
- a circularly shaped d-axis bypass positioned along a circular shape of an outside shape of the rotor; and
- an inverted-arcuate d-axis bypass positioned along a shape of a d-axis magnetic flux line so as to have an arcuate shape bent in a direction inverted with respect to an arcuate shape of the outside shape of the rotor.

11. The variable magnetomotive force rotary electric machine according to claim 10, wherein
the inverted-arcuate d-axis bypass is wider than the circularly shaped d-axis bypass.

12. The variable magnetomotive force rotary electric machine according to claim 11, wherein
the circularly shaped d-axis bypass and the inverted-arcuate d-axis bypass both form independent magnetic paths mutually separated by the magnetic gap part; and
among the d-axis bypasses, the d-axis bypass adjacent to the d-axis magnetic path passing through the at least one permanent magnet is magnetically separated from the d-axis magnetic path passing through the at least one permanent magnet, except at a connecting part on a front surface of the rotor.

13. The variable magnetomotive force rotary electric machine according to claim 10, wherein
the circularly shaped d-axis bypass and the inverted-arcuate d-axis bypass both form independent magnetic paths mutually separated by the magnetic gap part; and
among the d-axis bypasses, the d-axis bypass adjacent to the d-axis magnetic path passing through the at least one permanent magnet is magnetically separated from the d-axis magnetic path passing through the at least one permanent magnet, except at a connecting part on a front surface of the rotor.

14. The variable magnetomotive force rotary electric machine according to claim 1, wherein
the teeth of the stator are configured so that a ratio $\eta(\eta=A/B)$ satisfies the relationship $0.7 \leq \eta < 1.0$, where A represents a width of a first tooth portion constituting a primary magnetic path for winding the stator winding, and B represents a width of a second tooth portion adjacent the rotor.

15. The variable magnetomotive force rotary electric machine according to claim 1, wherein
a relationship between the coercivity (Hcj (kA/m)) of the at least one permanent magnet and a thickness (tm (mm)) of the at least one permanent magnet is set within a range given by a following equation: $-(1.05*tm)^2 + 33.8*tm - 359 < Hcj < (-243/tm) - 17$; and
a maximal current amplitude necessary for magnetization is 2 I or less, and a maximal current amplitude necessary for demagnetization is 0.5 I or less, where I is a maximal current value for electric current to flow without a change in a magnetization state when no angle advance control is performed.

16. The variable magnetomotive force rotary electric machine according to claim 1, wherein
the at least one permanent magnet includes characteristics of a pinning-type magnet.

17. The variable magnetomotive force rotary electric machine according to claim 1, wherein
the at least one permanent magnet is either a split magnet having at least two or more magnet segments that are layered and joined via an insulating layer, or a bond magnet having an insulating material that binds a magnetic powder.

18. The variable magnetomotive force rotary electric machine according to claim 1, wherein
a number of coil turns of the stator winding is set so that an induced voltage at the target rotational speed of a system exceeds a DC voltage of the system in cases where the at least one permanent magnet of the rotor is completely magnetized, and control other than flux weakening control is performed.

19. A control device for controlling the variable magnetomotive force rotary electric machine according claim 1, the control device comprising:
- a magnetic-flux-observer configured to estimate a magnetization state of the at least one permanent magnet based on a voltage value or a current value supplied to the rotary electric machine;
- a magnetization-maintaining control part configured to correct a deviation between a dq-axis current command value and a dq-axis current value based on information about the magnetization state and parameters set in advance;
- a voltage-command-value-generating part configured to generate a voltage command value based on a deviation corrected by the magnetization-maintaining control part;
- an inverter configured to drive the rotary electric machine on based a PWM signal generated on based on the voltage command value; and
- a current sensor configured to measure a current value outputted by the inverter.

20. The control device of a variable magnetomotive force rotary electric machine according to claim 19, wherein
the magnetization-maintaining control part corrects a q-axis current Iq based on a following equation: $Iq < \alpha \times Id + \beta(\Psi a)$, where Id represents a d-axis current, and $\alpha$ and $\beta$ represent functions of a magnetization level $\Psi a$.

* * * * *